United States Patent [19]

Constantinescu et al.

[11] 4,427,177
[45] Jan. 24, 1984

[54] SHOWER CONTROL

[76] Inventors: Spiridon Constantinescu, 2085 Islington Ave., Apt. 1408; Serban Constantinescu, 2085 Islington Ave., Apt. 1702, both of Weston, Ontario, Canada, M9P 3R1

[21] Appl. No.: 257,545

[22] Filed: Apr. 27, 1981

[51] Int. Cl.³ .............................................. F16K 5/06
[52] U.S. Cl. .................................... 251/230; 251/288; 251/294; 251/315
[58] Field of Search ................... 239/562; 251/77, 81, 251/230, 288, 294, 309, 315

[56] References Cited

U.S. PATENT DOCUMENTS

| 1,095,295 | 5/1914 | Stevens | 251/230 |
| 1,511,953 | 10/1924 | Dwyer | 251/230 |
| 1,519,157 | 12/1924 | Muller | 251/230 X |
| 4,177,972 | 12/1979 | Legris | 251/288 |
| 4,311,279 | 1/1982 | Jette | 239/562 |

FOREIGN PATENT DOCUMENTS 2033551 5/1980 United Kingdom ................ 251/309

Primary Examiner—Andres Kashnikow

[57] ABSTRACT

A shower control consisting of a ball valve mounted into a shower arm and being activated by a rotatable device attached to the ball valve. The flow of mixed water through the shower head can be stopped or allowed for economical and convenient reasons by pulling continuously a beaded chain which operates the device and furthermore the ball valve.

1 Claim, 8 Drawing Figures

SHOWER CONTROL

BACKGROUND OF THE INVENTION

Taking a shower has been very popular for a long time and besides its main practical and hygienic factors, the impact of jets of water on the surface of the human body results in a stimulating action of the skin and of the nervous system. Taking a shower is more popular than taking a bath in a tub. This means that an important quantity of water and caloric energy is spent daily.

Suppose one shower uses 150 liters of heated water from 10 degrees Cel. to 40 degrees Cel. thereby consuming 4500 Cal. Considering for North America $10^8$ showers daily, the result is $15 \times 10^6$ cubic meters of water and $45 \times 10^{10}$ Cal. or an energy of $5 \times 10^4$ tons in equivalent oil used per day. These figures being for a conventional carburetant of 9000 Cal. per kilogram excepting the loss.

The course of a shower has three phases: the first is to wet the skin and to warm the body, the second is to soap the skin and to massage the body, and the third is to rinse off the soap and to refresh the body. The approximate fractions of these three phases from a shower bath time are: for the first phase 30%, for the second phase 30%, and for the third phase 40%. The second phase does not need the flow of water, but contrary the flow creates inconveniences and for that reason some people use the diverter valve to direct the flow through the tap into the tub, other people divert the shower head to flow beside them, other people when possible, step aside from the flow of water which runs wastefully, other people soap themselves under the shower stream and a few people turn off the water and as a result they have to rearrange the right flow of hot and cold water for the blended mixture and to manipulate the diverter, thus requiring six manipulations. Only control devices equiped to deliver thermostatically controlled water can be simply manipulated to stop or to allow the flow of mixed water, but they are expensive and unpopular for individual showers, being commonly used for gang-type showers that are installed in many schools, factories or hospitals.

The direct control of the stream of a shower head by the person who is taking the shower, stopping or allowing the flow of blended mixture by a quite simple manipulation is very important for two main reasons: the convenience to soap the skin, and to massage the body being undisturbed by unnecessary water, and the economy of water, of caloric energy and of soap which sometimes is spent senselessly.

The conventional energy which can be saved in North America is roughly $0.3 \times 5 \times 10^4$ tons of oil per day or $4.5 \times 10^6$ tons of oil per year, and for a normal family the economy can be between $80 and $100 per year.

Thus, the invention herein relates to an inexpensive and simple device which can be manipulated close to the shower fixture to control the flow of blended mixture at the convenience of the person who takes the shower bath.

SUMMARY OF THE INVENTION

In accordance with the invention, an improved method for stopping or for allowing the stream of blended mixture through a shower head is provided; wherein the device is mounted into a shower arm and consists basically of a ball valve and is manipulated by pulling a beaded chain continuously.

The principal object of invention is to provide a shower control which can be manipulated simply by the person who takes the shower.

A further object of invention is to provide means of rationally using the stream of a shower for the convenience of the person who takes this shower when soap must be used.

A further object of invention is to provide a method for taking a shower in which important quantities of energy and water can be saved.

A further object of the invention is to improve the habit of taking a shower and due to it the shower bath will become more popular and will be practiced even by people who now fail to use this kind of bath for the inconvenience of continuously running water.

These and other objects and advantages of this invention will become apparent upon reading the following description, of which the attached drawings form a part.

DETAILED DESCRIPTION

Figure 1:
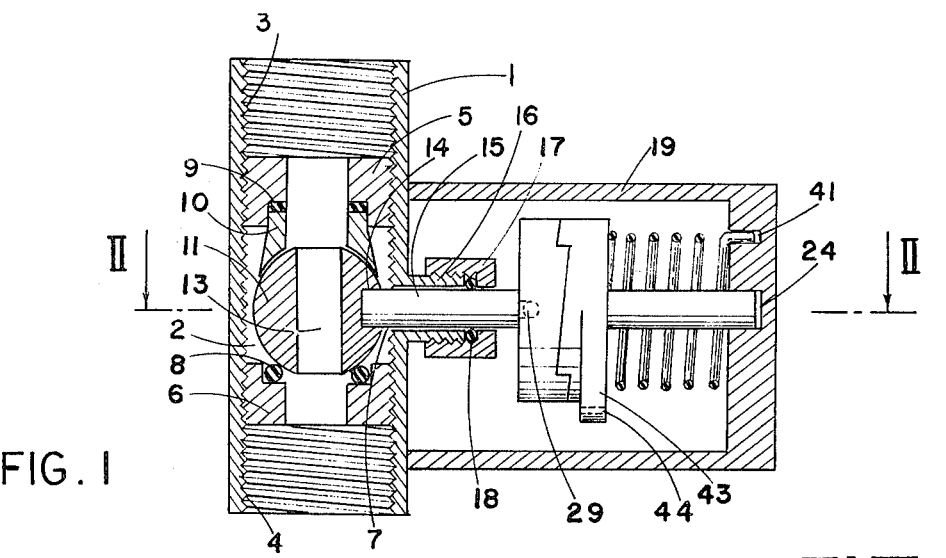
FIG. 1 is a sectional view through a shower control of a ball assembly operated by a beaded chain.
Figure 2:
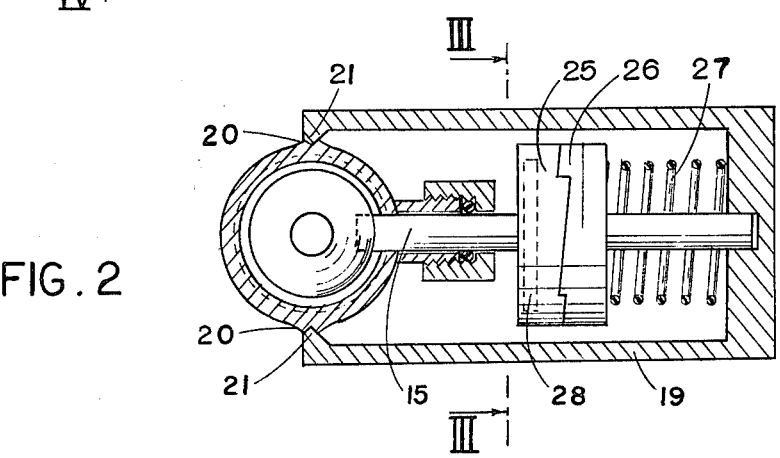
FIG. 2 is a section of the line II—II of FIG. 1.
Figure 3:
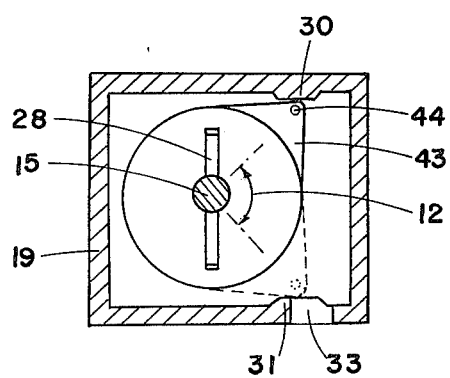
FIG. 3 is a section of the line III—III of FIG. 2.
Figure 4:
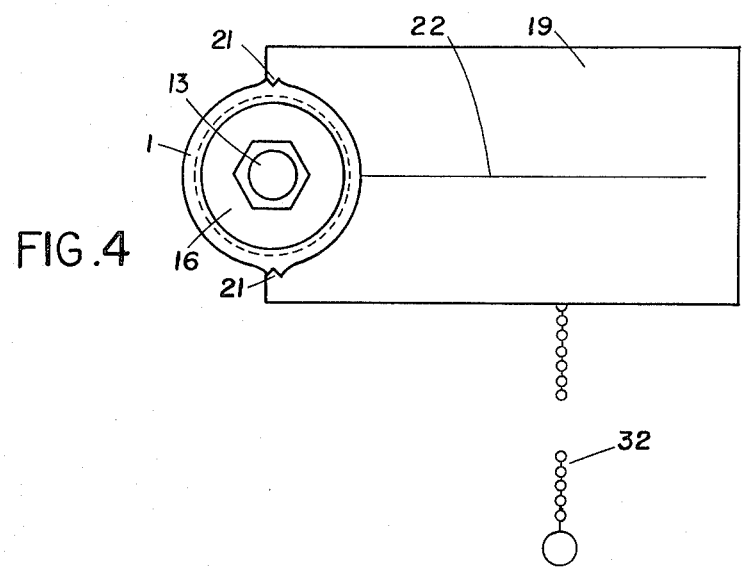
FIG. 4 is a view according to line IV—IV of FIG. 1.
Figure 5:
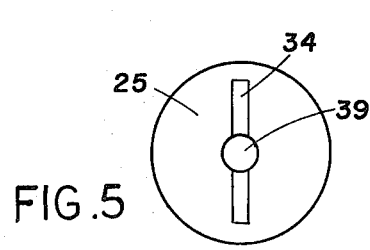
FIG. 5 is a view of the face close to ball valve of the driven ratchet disk.
Figure 6:
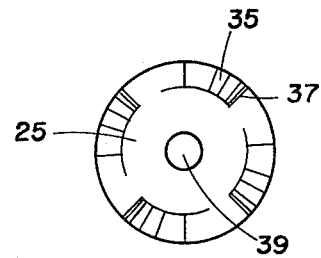
FIG. 6 is a view of the face away from ball valve of the driven ratchet disk.
Figure 7:
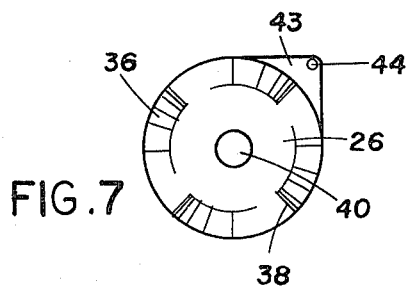
FIG. 7 is a view of the face close to ball valve of the driving ratchet disk.
Figure 8:
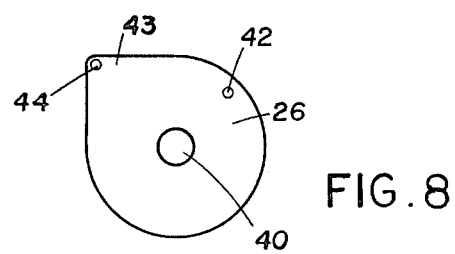
FIG. 8 is a view if the face away from ball valve of the driving ratchet disk.

Referring now more particularly to the drawings, the shower control is a ball valve FIG. 1 having a cylindrical housing 1 threaded as at 3 and 4 which can be placed in a run of a pipe connecting a mixing faucet to a shower head and more particularly in a shower arm. Within cylindrical housing 1 it is rotatable mounted ball type plug 11 having a diameter smaller than the housing diameter and being inserted inside valve chamber 2 between threaded ports 3 and 4. Ball type valve 11 is held in place and sealed by sealing nuts 5 and 6, elastomeric seal o-ring 8, elastomeric seal washer 9 and elastomeric spherical washer 10. Ball plug 11 has also cylindrical groove 14 for receiving and solid connecting valve stem 15. Ball plug 11 has also axial port 13 for allowing the flow of mixed water when the valve is open. Cylindrical housing has lateral port 7 solid connected to short sleeve 16 which receives inside valve stem 15 for rotating ball plug 11. The opening between short sleeve 16 and valve stem 15 is packed and sealed by packing nut 17 and packing ring 18. Cylindrical housing 1 has two exterior longitudinal clasping ridges 20 for attaching casing by means of clip 21 which can be pushed away by opening scission 22. Valve stem 15 has one end fixed to ball plug 11 and the other end supported in bearing 24 of casing 19 and has also hole 29 for receiving pin 28. Pin 28 is rotated by driven ratchet disk 25 by means of semicylindrical groove 34. Driven ratchet disk 25 has circular central opening 39 which receives valve stem 15 and has also a set of four ratchets 35 with cutting radial slots 37 which mesh cutting radial slots 38 of ratchets 36 of driving ratchet disk 26. Driving ratchet disc 26 has circular central opening 40 for receiving valve stem 15, has eccentric 43 with hole 44 and has also cylindrical groove 42. Torsion-compression spring 27 is axially mounted around valve stem 15 and has one end fast in cylindrical groove 42 and the other end fast in cylindrical groove 41 of casing 19. Torsion-compression spring 27 turns permanently driving ratchet disk 26 against the linear motion when pulling beaded chain 32, and also presses permanently driving ratchet disk 26 against driven ratchet disk 25. Beaded chain 32 is hooked to hole 44 and passes through opening 33 of casing 19. Pulling beaded chain 32, eccentric 43 converts the linear motion of beaded chain into a rotary motion of driving ratchet 26 which can rotate an angle slightly bigger than 90° (see 12) between stops 30 and 31 of casing 19. Then driven ratchet disk 25 rotates 90° ball plug 11 by means of cylindrical pin 28 and valve stem 15, for closing or opening the ball valve mounted into the shower arm.

Having described the invention, what we claim is:

1. In a shower control valve including means to be placed in a run of a pipe connecting a mixing faucet to a shower head; a cylindrical housing having an axial flow opening therethrough, interior throughout threads, a lateral port, a short sleeve fixed to said lateral port; a ball type plug having a cylindical groove; axial means to support and to seal said ball type plug in its rotary motion inside said cylindrical housing; a valve stem having its inner end fixed into said cylindrical groove to rotate said ball type plug inside said cylindrical housing; and packing means for sealing said valve stem to said short sleeve; the improvement comprising, in combination, a rotatable device having
   (a) two exterior opposite longitudinal clasping ridges on said cylindrical housing for attaching said rotatable device;
   (b) a first hole made transversally in said valve stem for connecting said rotatable device;
   (c) a casing attached to said cylindrical housing; said casing having
      (1) two opposite clips for attaching said casing to said cylindrical housing;
      (2) two opposite scissions for clasping said clips;
      (3) a bearing placed axially inside said casing opposite to said clips for supporting the outer end of said valve stem;
      (4) two stops inside said casing defining an angle slightly bigger than 90° with reference to the axis of said valve stem;
      (5) an opening into the underneath side of said casing for manipulating from outside said rotatable device; and
      (6) a first cylindrical groove placed inside said casing into the opposite side to said clips;
   (d) a cylindrical pin entering in said first hole for rotating said valve stem;
   (e) a driven ratchet disk axially mounted on said valve stem engaging said cylindrical pin in a rotatable movement; said driven ratchet disk having
      (1) a first circular central opening for receiving inside said valve stem;
      (2) a semicylindrical groove on the face close to said ball type plug, for engaging said cylindrical pin; and
      (3) a first set of four ratchets placed on the face away from said ball valve plug;
   (f) a driving ratchet disk axially mounted on said valve stem for engaging said driven ratchet disk in a rotatable movement; said driving ratchet disk having
      (1) a second circular central opening for receiving inside said valve stem;
      (2) a second set of four ratchets placed on the face close to said ball type plug for cooperating with said first set of four ratchets in a rotary motion;
      (3) an eccentric for moving between said two stops and for converting a linear motion into a rotary motion;
      (4) a second hole into the end of said eccentric; and
      (5) a second cylindrical groove placed on the face away from said ball type plug;
   (g) a torsion-compression spring axially mounted around said valve stem and having a first end fast in said first cylindrical groove and a second end fast in said second cylindrical groove, said torsion-compression spring compressing permanently said driving ratchet disk against said driven ratchet disk and turning permanently said driving ratchet disk against the downward linear motion of said eccentric; and
   (h) a beaded chain hooked to said second hole and passing through said opening of said casing for pulling said eccentric to alternately close or open said ball type plug.

* * * * *